(12) United States Patent
Yeo et al.

(10) Patent No.: US 6,404,730 B2
(45) Date of Patent: *Jun. 11, 2002

(54) OPTICAL DISK HAVING A GROOVE AND A PROJECTION FOR COMBINING TWO DISK MEMBERS

(75) Inventors: Woon-Sung Yeo; Hyung-Kyu Kim, both of Chungcheongbukdo (KR)

(73) Assignee: LG Electronics Inc., Seoul (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/291,953

(22) Filed: Apr. 15, 1999

(30) Foreign Application Priority Data

Apr. 15, 1998 (KR) .............................................. 98-13502

(51) Int. Cl.[7] .............................. G11B 3/70; G11B 5/84; G11B 7/26; B32B 3/02

(52) U.S. Cl. ...................................... 369/281; 428/64.4

(58) Field of Search ................................ 369/283, 291, 369/281; 360/131, 135; 428/64.1, 64.3, 64.4, 65.2, 65.3, 66.6, 694 ST

(56) References Cited

U.S. PATENT DOCUMENTS

| | | | | | |
|---|---|---|---|---|---|
| 2,776,838 | A | * | 1/1957 | Mueller | 369/239 |
| 4,555,716 | A | * | 11/1985 | Odawara et al. | 346/137 |
| 4,837,784 | A | * | 6/1989 | Yamamori | 369/289 |
| 5,167,996 | A | * | 12/1992 | Kurisu et al. | 428/65.1 |
| 5,448,553 | A | * | 9/1995 | Suzuki et al. | 369/290 |
| 5,458,940 | A | * | 10/1995 | Woo | 428/64.3 |
| 5,579,296 | A | * | 11/1996 | Smith et al. | 369/273 |
| 5,713,463 | A | * | 2/1998 | Lakoski et al. | 206/308.1 |
| 5,714,222 | A | * | 2/1998 | Yokoyama | 428/64.1 |
| 5,997,976 | A | * | 12/1999 | Mueller et al. | 428/64.1 |
| 6,070,752 | A | * | 6/2000 | Nava et al. | 220/521 |

* cited by examiner

Primary Examiner—Robert S. Tupper
Assistant Examiner—Julie Anne Watko

(57) ABSTRACT

A disk medium and a method of manufacturing the disk medium are disclosed. The disk medium includes a first disk member having a penetrating hole, and a second disk member having a projecting portion, wherein the projecting portion is placed within the penetrating hole of the first disk member to form the optical medium. The method includes forming a first disk member having a penetrating hole, forming a second disk member having a projecting portion, and positioning the projecting portion of the second disk member within the penetrating hole of the first disk member, whereby the first and disk members are combined to form an optical medium.

2 Claims, 11 Drawing Sheets

OPTICAL DISK HAVING A GROOVE AND A PROJECTION FOR COMBINING TWO DISK MEMBERS

BACKGROUND OF THE INVENTION

1. Field of the Invention

The present invention relates generally to an optical medium and a method for manufacturing the optical medium, and more particularly, but not by way of limitation, to an optical disk and a method for manufacturing the optical disk using an improved bonding and centering method for reducing errors caused by conventional bonding processes.

2. Description of the Related Art

Digital Video Disc (DVD) is an optical information recording medium capable of storing a large amount of high definition image data. Due to its various advantages such as good portability and high storage capacity, the DVD has received much attention as the new information recording medium for the next generation.

The diameter and thickness of a conventional DVD are typically 12 cm and 0.6 mm, respectively. Compared to a conventional Compact Disc (CD) having a diameter of 12 cm and a thickness of 1.2 mm, the conventional DVD has exactly one-half of the thickness of the conventional CD. The conventional DVD having the thickness of only 0.6 mm, however, is extremely difficult to carry because it is so thin and susceptible to bending and damages. For this reason, currently available DVDs are formed by bonding two identical disk members to each other, each disk member having a thickness of 0.6 mm. As a result, the currently available DVDs offer good portability because of an increased thickness, and has a high storage capacity since information can be recorded on both sides of the DVD.

To manufacture the above-described DVD, a bonding process is required to bond the two identical disk mediums to each other. The bonding process will be described briefly in conjunction with the entire process of manufacturing the conventional DVD.

First, a photo resist is deposited uniformly on a well-polished glass plate (also known as a glass master substrate), and desired information is recorded on the glass plate by sensitizing the photo resist using a laser beam modulated according to the information to be recorded. A glass master is obtained by developing the photo resist and a metal master is obtained by electroplating the obtained glass master. Then, several mothers can be obtained from the metal master, and subsequently several stampers can be obtained from the mothers. This process is commonly called a mastering process.

A stamper provided by the mastering process is adjusted to fit into an injection molding machine, so that an injection molding process is performed to produce a transparent substrate. The injection molding process injects a polycarbonate resin into the mold containing the stamper, whereby a transparent disk member is obtained.

Next, the obtained transparent disk member is coated with an aluminum reflective film by a sputtering process, which sputters and places metal ions on the transparent substrate.

When the sputtering process is completed, a UV bonding material, e.g., UV resin, is dropped onto the central part of the disk member while the disk is rotated at a high speed. The high-speed rotation of the disk member creates centrifugal force by which the UV bonding material is instantaneously and uniformly distributed over the entire disk member. Lastly, the UV bonding material is cured by irradiating ultraviolet rays on the disk member, whereby a protective layer is formed on the disk member to prevent oxidation of the coated aluminum reflective film.

Then two of the identical disk members formed according to the above-described procedures, each disk member having a 0.6 mm thickness, are bonded to each other to form a conventional DVD. To bond the two disk members, the spin-coating method, hot-melting method, and double-sided tape method are generally used, among which the spin coating method is the most common.

There are two conventional methods, the radical method and cationic method, which use the spin coating process to bond the two disk members to form a conventional DVD. The two methods are similar in that UV bonding materials are applied to the substrate by the spin coating method. A difference between the two methods is that the radical method conducts the bonding process before curing the UV bonding materials, whereas the cationic method completes curing the UV bonding materials before the disk bonding process. The radical method can be considered more common than the cationic method.

FIG. 1 is a flowchart showing a conventional bonding process for forming a conventional DVD. As shown therein, a first disk member is transferred to a bonding machine in Step S101. After loading the first disk member onto a motor shaft in Step S103, a UV bonding material is applied onto the central part of the first disk member while the first disk member is rotated at a low speed in Step S105.

Subsequently, a second disk member is placed on top of the first disk member and the first and second disk members are rotated at a high speed. The centrifugal force created by the high-speed rotation of the first and second disk members uniformly spreads the UV bonding material over the surfaces of the first and second disk members, thereby securely bonding the first and second disk members to each other in Step S107.

In Step S109, ultraviolet rays are irradiated onto the rotating bonded disk members to cure the UV bonding material, and the bonded disk members are unloaded in Step S111, whereby the bonding process is completed and a conventional DVD is manufactured.

The bonding process as shown in FIG. 1, however, has serious problems. For example, the center hole diameter of the finally manufactured DVD exceeds an allowable deviation limit, even though the disk members bonded together satisfy the requirement for the center hole diameter specified by DVD physical format books.

To investigate an error rate caused by the conventional bonding process, experiments of bonding two substrates having a center hole diameter of 15.003 mm have been conducted. The two substrates were made by an injection molding machine by Meiki company and were bonded to each other using a bonding machine with jigs having center hole diameters of 15.001 mm and 15.002 mm. One hundred experiments were performed using each jig and the experimental results indicated that the jig having the center hole diameter of 15.001 mm has an error rate of 22.2% and that the other jig has an error rate of 9.8%.

The centering problem of the conventional bonding process can be solved if the injection molding machine can produce disk members having an identical center hole diameter or if the center hole of the jig can be adjusted to perfectly match that of the substrate. With currently available technology, however, it is almost impossible to satisfy these requirements, such that the centering process of conventional bonding processes has been a major obstacle in the DVD manufacturing process. Moreover, because the bonding process is a significant part of the DVD manufacturing process, any errors caused by the bonding process increase the production cost.

SUMMARY OF THE INVENTION

An object of the present invention is to provide an optical medium and a method for manufacturing the optical medium, capable of reducing errors caused by a centering process using a simpler bonding method.

Briefly described, the present invention is directed to a disk medium, including a first disk member having a penetrating hole, and a second disk member having a projecting portion, the projecting portion being placed within the penetrating hole of the first disk member, whereby the first and disk members are combined.

The present invention is further directed to a method of manufacturing an optical medium, including forming a first disk member having a penetrating hole, forming a second disk member having a projecting portion, and positioning the projecting portion of the second disk member within the penetrating hole of the first disk member, whereby the first and second disk members are combined to manufacture an optical medium.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention, illustrate the preferred embodiments of this invention, and together with the description, serve to explain the principles of the present invention.

In the drawings.

DETAILED DESCRIPTION OF THE PREFERRED EMBODIMENTS

Figure 1:
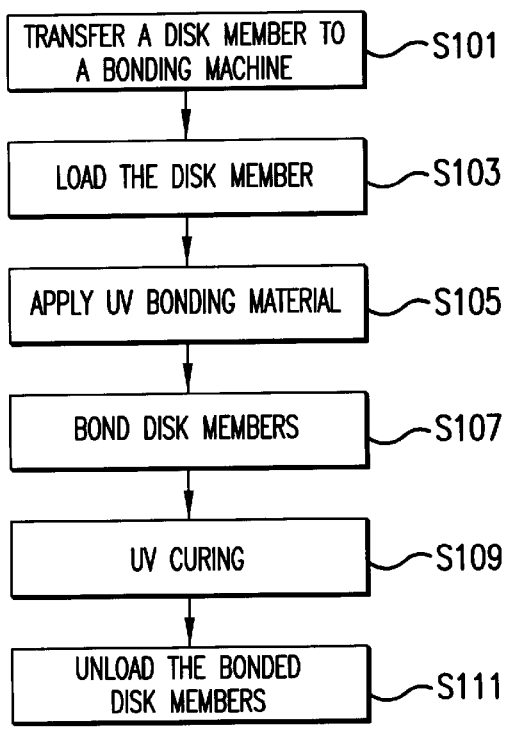
FIG. 1 is a flowchart showing a bonding process employed in a conventional disk manufacturing method.
Figure 2A:
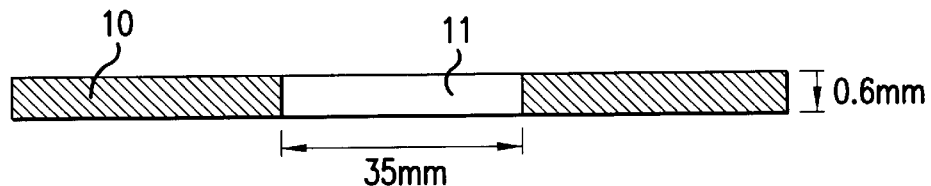
FIGS. 2A and 2B show cross-sectional views of first and second disk members of an optical disk, respectively, according to a first embodiment of the present invention.
Figure 2B:
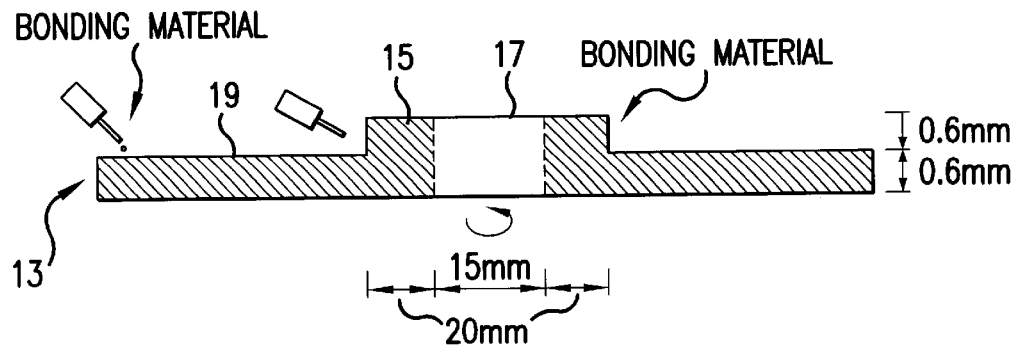

The preferred embodiments of the present invention will be described in detail referring to the accompanying drawings FIGS. 2A and 2B respectively show cross-sectional views of first and second disk members of an optical disk according to the first embodiment of the present invention. As shown in FIG. 2A, the first disk member 10 includes a penetrating hole 11 having a diameter of 35 mm (instead of a standard-sized center hole), and has a thickness of 0.6 mm. The second disk member 13 as shown in FIG. 2B includes a cylindrical-shaped projecting portion 15 formed at the center of the second disk member 13, and a ring portion 19 surrounding the projecting portion 15. The projecting portion 15 has a diameter of 35 mm and includes a center hole 17 having a diameter of 15 mm.

Each of the first and second disk members 10 and 13 has an overall diameter of 120 mm. The thickness of the ring portion 19 of the second disk member 13 is 0.6 mm and the thickness of the projecting portion 15 is 1.2 mm. The projecting portion 15 of the second disk member 13 is inserted into the penetrating hole 11 of the first disk member 11. The total thickness of the first and second disk members 10 and 13 as bonded to each other is uniformly at 1.2 mm.

A method of manufacturing an optical disk according to the first embodiment of the present invention is described below referring to FIGS. 2A–2E.

First, the second disk member 13 is loaded on a motor shaft of an injection machine and is rotated at a low speed of, e.g., about 30~40 rpm. Then, a UV bonding material is applied onto inner parts (e.g., 17~18 mm from the center) and outer parts (e.g., 118 mm from the center) of the second disk member 13 as shown in FIG. 2B, wherein an appropriate time duration for the application of the UV bonding material may be, e.g., for a 1¼ disk revolution. The areas of the second disk member 13 onto which the UV bonding material are applied should have a good optical transmissivity so that the bonding material is easily cured when it is exposed to ultraviolet rays.

Figure 3:
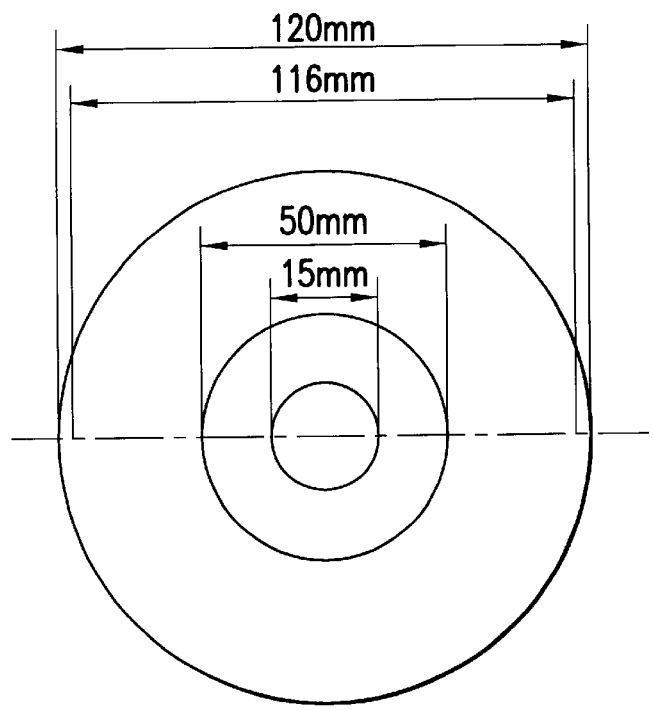
FIG. 3 shows an example of general dimensions of an optical disk according to the embodiments of the present invention.

As shown in FIG. 3, since optical disks may have a clamp area diameter of 50 mm around the center hole, data are recorded on the areas of the optical disk outside the clamp area. Consequently, the UV bonding material may be applied only onto the areas of the second disk member 13 with no recording or reflective layer (i.e., where data are not recorded).

Figure 2C:
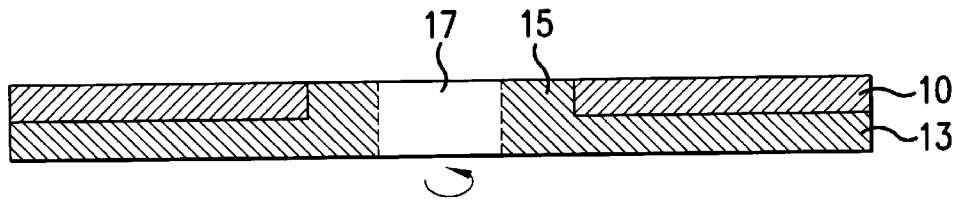
FIGS. 2C–2E are cross-sectional views of the optical disk according to the first embodiment of the present invention.
Figure 2D:
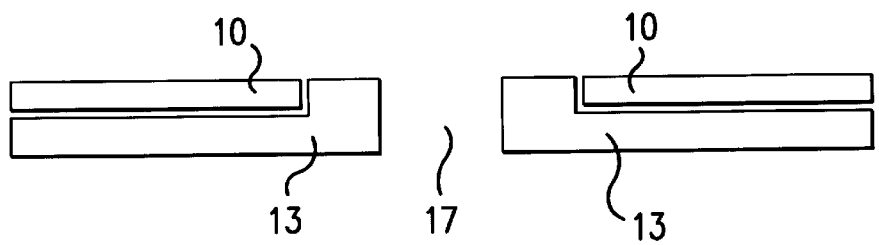

Then, as shown in FIG. 2C, the first disk member 10 is stacked up on top of the second disk member 13 by placing the projecting portion 15 of the second disk member 13 within the penetrating hole 11 of the first disk member 10. Subsequently, the stacked first and second disk members 10 and 13 are rotated at a high speed of, e.g., about 3000 rpm, as shown in FIG. 2D to uniformly spread the applied UV bonding material over the entire surfaces of the disk members 10 and 13.

Figure 2E:
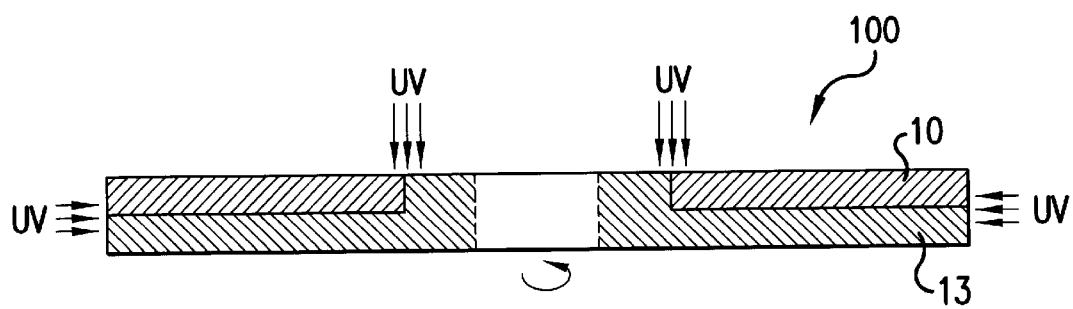

The bonded disk members 10 and 13 are further rotated during which ultraviolet rays are irradiated onto the UV bonding material of the disk members 10 and 10 to cure the UV bonding material, as shown in FIG. 2E. Then labels can be printed on the bonded disk members 10 and 13 to form an optical disk 100.

Since the projecting portion 15 is fittingly positioned within the penetrating hole 11 as the disk members 10 and 13 are bonded, the overall shape of the optical disk 100 is the same or substantially the same as a standard optical disk formed with two identical disk members. Further, since only the second disk member 13 has the center hole 17, centering is required only for the second disk member 13 during the bonding process, whereby errors due to centering problems are eliminated or significantly reduced. Furthermore, since the UV bonding material is applied only onto the non-recording areas of the optical disk 100, only a small amount of bonding material is used for each optical disk 100. Moreover, the bonding material can be easily cured using low-powered ultraviolet rays.

Figure 4A:
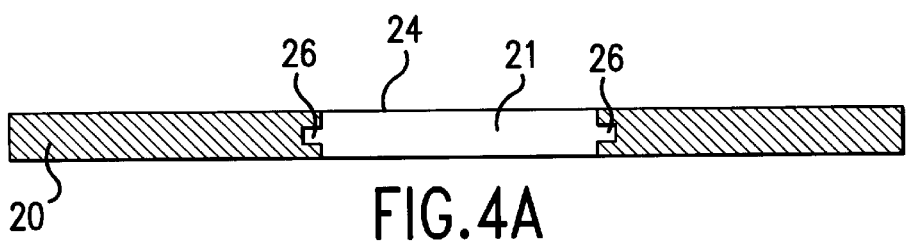
FIG. 4A shows cross-sectional view of a first disk member of an optical disk according to a second embodiment of the present invention.
Figure 4B:
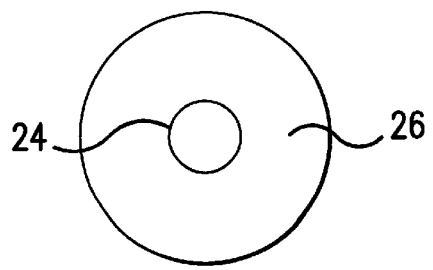
FIG. 4B shows a top view of the first disk member of FIG. 4A.
Figure 4C:
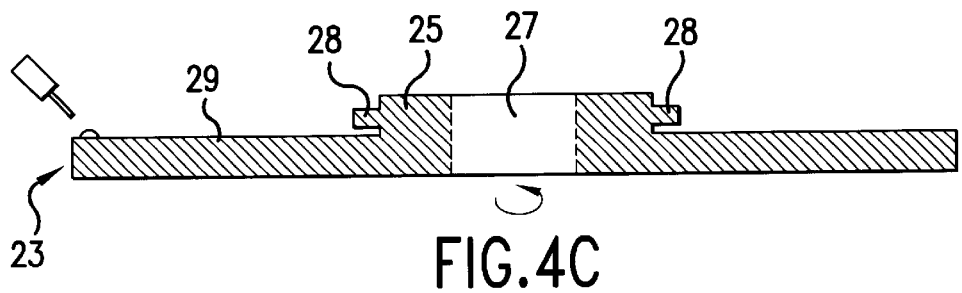
FIG. 4C shows cross-sectional view of a second disk member of the optical disk according to the second embodiment of the present invention.
Figure 4D:
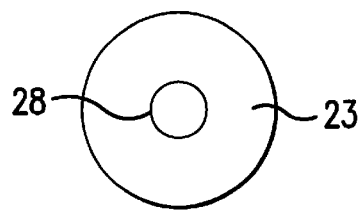
FIG. 4D shows a top view of the second disk member of FIG. 4C.

FIG. 4A shows cross-sectional and top views of a first disk member of an optical disk, FIG. 4B shows cross-sectional and top views of a second disk member of the optical disk, and FIGS. 4C and 4D are cross-sectional views of the optical disk composed with the first and second disk members of FIGS. 4B and 4C, all according to the second embodiment of the present invention. The overall dimensions of the first and second disk members in the second embodiment can be the same as those in the first embodiment.

As shown in FIGS. 4A–4B, a first disk member 20 includes a penetrating hole 21 formed at the center of the first disk member 20, and a groove 26 circumferentially formed on its inner sidewalls 24. The thickness of the first disk member 20 can be, e.g., 0.6 mm, and the diameter of the penetrating hole 21 can be, e.g., 35 mm.

A second disk member 23 as shown in FIGS. 4C–4D has a projection 28 circumferentially formed on the outer sidewalls of a projection portion 25, a center hole 27 formed at the center of the projection portion 25, and an outer ring portion 29. The projection 28 is fitted into the groove 26 of the first disk member 20. As in the first embodiment of the present invention, only one disk member (the second disk member 23) has the center hole 27. The depth of the groove 26 can be selected so that the groove 26 remains within the clamp area with a diameter of 50 mm, so as to prevent damages to the recording layer which may be caused by the groove 26.

Figure 4E:
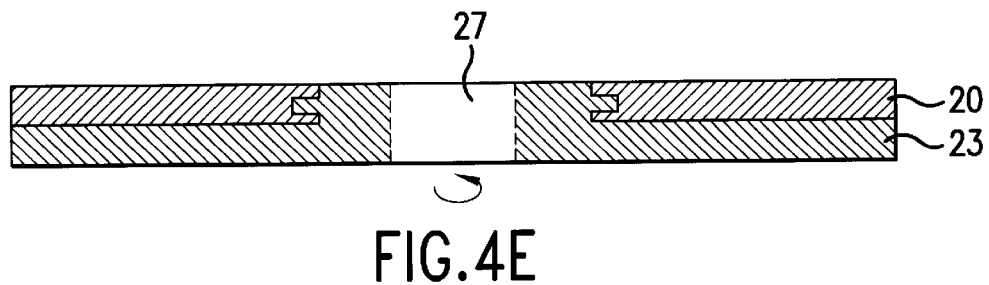
FIG. 4E is a cross-sectional view of the optical disk composed with the first and second disk member of FIG. 4A and 4B according to the second embodiment of the present invention.
Figure 4F:
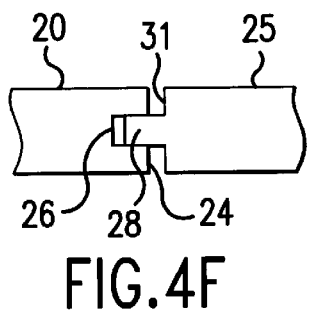
FIG. 4F is a cross-sectional view of a junction of the groove of the first disk member and projection of the second disk member of FIGS. 4A and 4C, respectively.
Figure 4G:
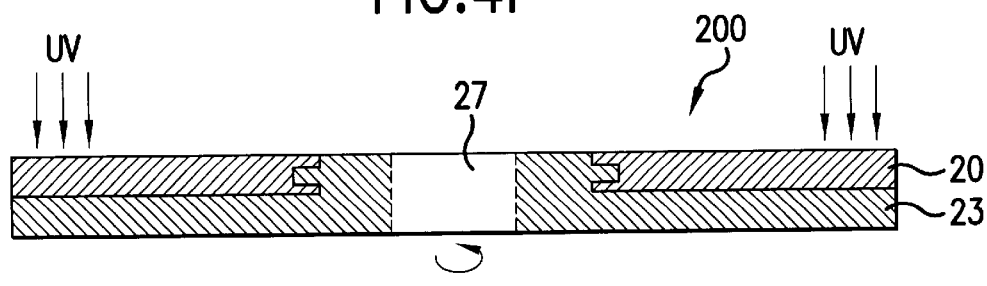
FIG. 4G is a cross-sectional as in FIG. 4E with UV rays.

When bonding the first and second disk members 20 and 23 to each other, a UV bonding material can be applied only onto the outer parts of the second disk member 23 as shown in FIG. 4C. Then the first and second disk members 20 and 23 are fitted to each other as shown in FIG. 4E. The high speed rotation of the fitted disk members 20 and 23 causes the UV bonding material to be uniformly distributed to the surfaces of the disk members 20 and 23. Thereafter, ultraviolet rays are irradiated only onto the areas indicated by arrows as shown in FIG. 4G to manufacture an optical disk 200 (e.g., DVD), because the inner parts of the disk members 20 and 23 are secured by the cooperation of the projection 28 with the groove 26 as shown in FIG. 4E.

Figure 5A:
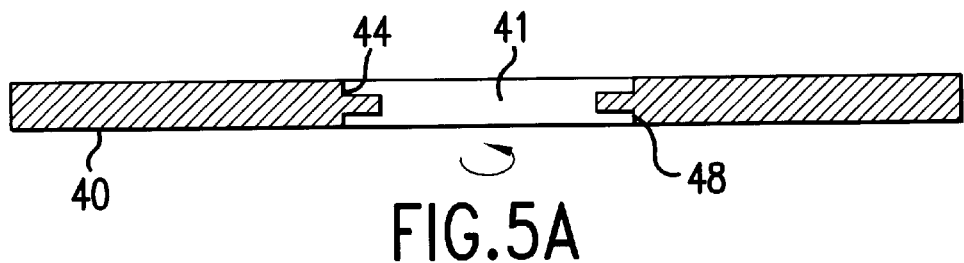
FIGS. 5A and 5B show cross-sectional and top views of a first disk member of an optical disk according to a third embodiment of the present invention, respectively.
Figure 5B:
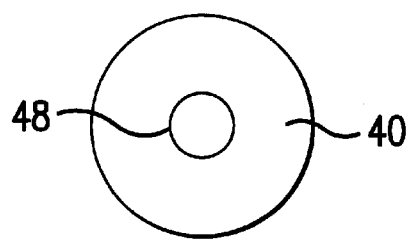
Figure 5C:
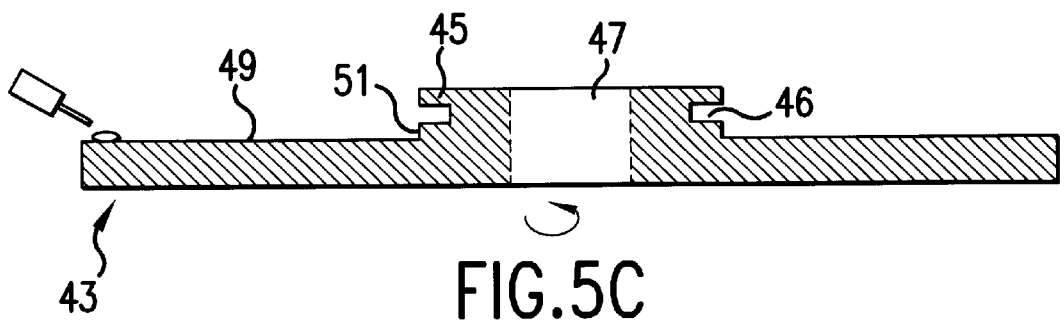
FIGS. 5C and 5D show cross-sectional and top views of a second disk member of the optical disk according to the third embodiment of the present invention, respectively.
Figure 5D:
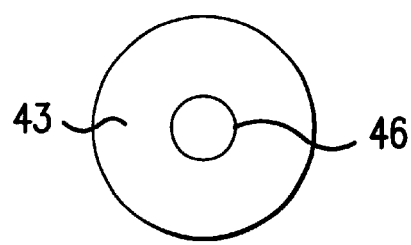
Figure 5E:
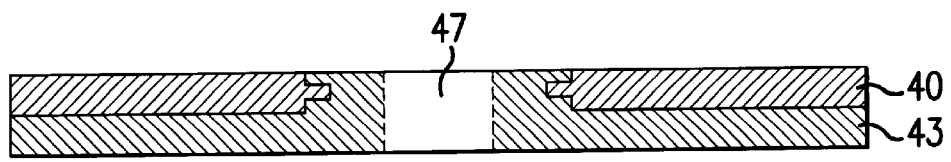
FIG. 5E is a cross-sectional view of the optical disk composed with the first and second disk members of FIGS. 5A and 5B according to the third embodiment of the present invention.
Figure 5F:
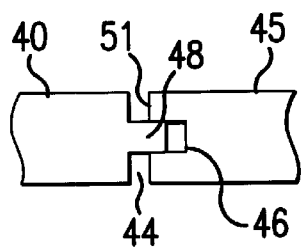
FIG. 5F is a cross-sectional view of the junction between the projection of the first disk and groove of the second disk of FIGS. 5A and 5C, respectively.
Figure 5G:
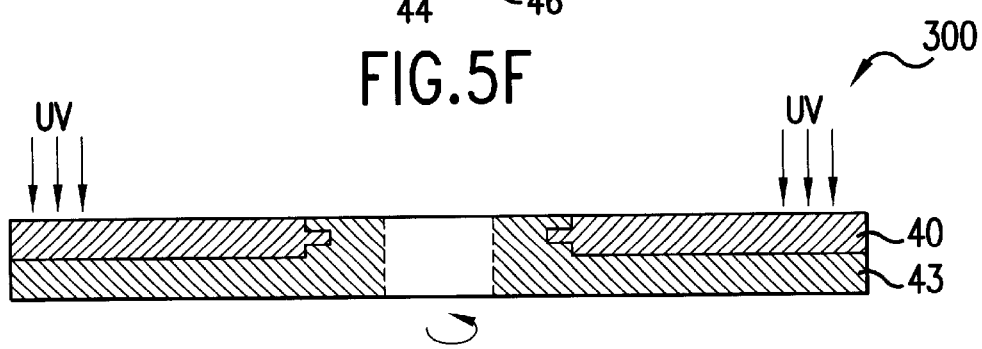
FIG. 5G is a cross-sectional as in FIG. 5G with UV rays.

FIGS. 5A–5G illustrate steps for manufacturing an optical disk according to the third embodiment of the present invention. The third embodiment is similar to the second embodiment including the general dimensions of the disk members, except that the projection and groove are formed on the different disk members. In the third embodiment, a first disk member 40 has a penetrating hole 41 with a projection 48 circumferentially formed on its inner sidewalls 44 as shown in FIGS. 5A–5B. A second disk member 43 includes a circumferentially disposed groove 46 on the outer sidewalls 51 of the projecting portion 45 as shown in FIG. 5C–5D. The second disk member 43 further includes a center hole 47 formed at the center of the disk member 43 and the projection portion 45, and an outer ring portion 49.

As shown in FIGS. 5C to 5G, the area onto which a UV bonding material is applied and the area onto which ultraviolet rays are irradiated are the same as the second embodiment. Accordingly, an optical disk 300 is manufactured.

Figure 6A:
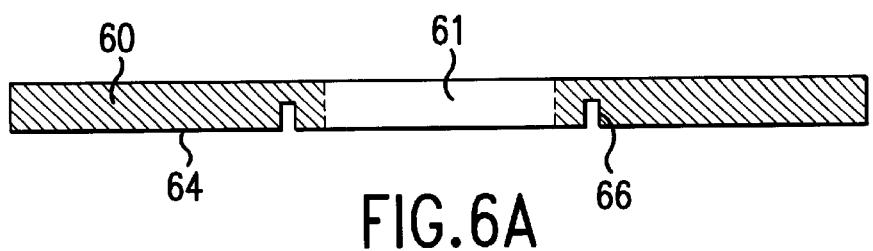
FIGS. 6A and 6B show cross-sectional and top views of a first disk member of an optical disk according to a fourth embodiment of the present invention, respectively.
Figure 6B:
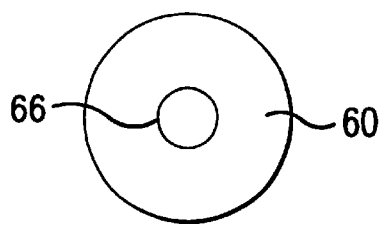
Figure 6C:
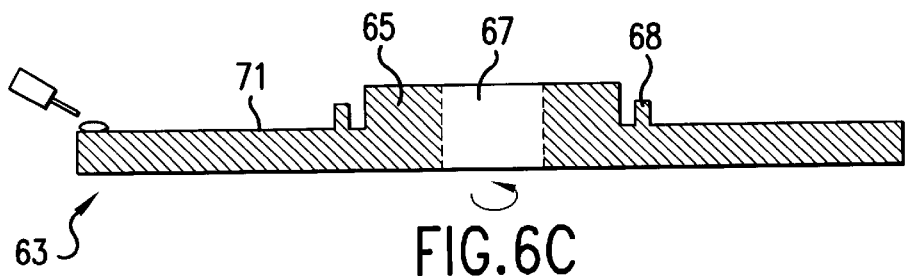
FIGS. 6C and 6D show cross-sectional and top views of a second disk member of the optical disk according to the fourth embodiment of the present invention, respectively.
Figure 6D:
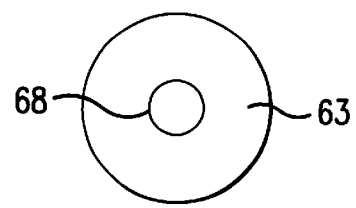
Figure 6E:
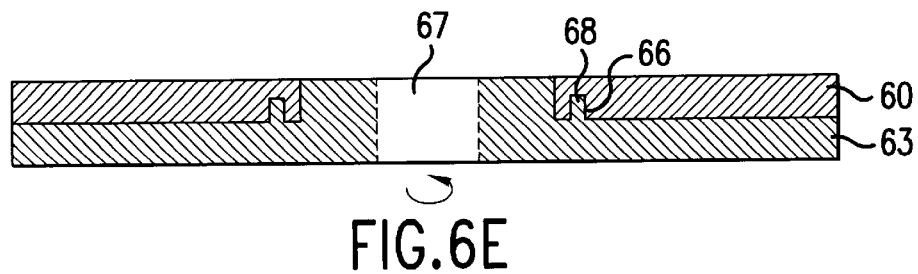
FIGS. 6E and 6F are cross-sectional views of the optical disk composed with the first and second disk members of FIGS. 6A and 6B according to the fourth embodiment of the present invention.
Figure 6F:
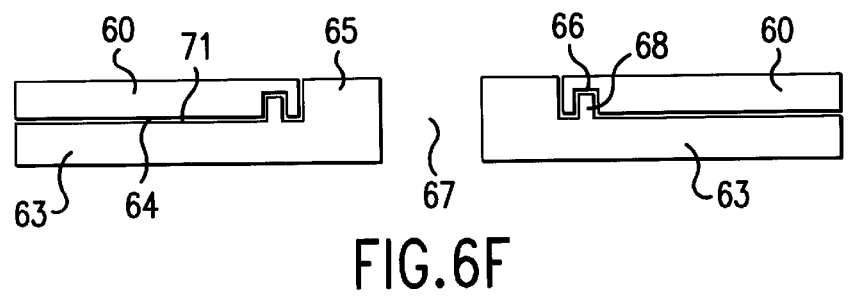

FIGS. 6A–6G illustrate steps for manufacturing an optical disk according to the forth embodiment of the present invention. The overall shape and dimensions of each of the first and second disk members are similar to those of the first embodiment. But on a surface 64 of a first disk member 60, a ring-shaped groove 66 (e.g., circumferentially formed-groove) is formed a predetermined distance away from a penetrating hole 61 as shown in FIG. 6A. A second disk member 63 has a projection 68 circumferentially formed at a prescribed distance from a projecting portion 65, and the projection 68 is fitted into the groove 66 as shown in FIGS. 6E–6F. As in the previous embodiments, a center hole 67 is formed only in the second disk member 63.

Figure 6G:
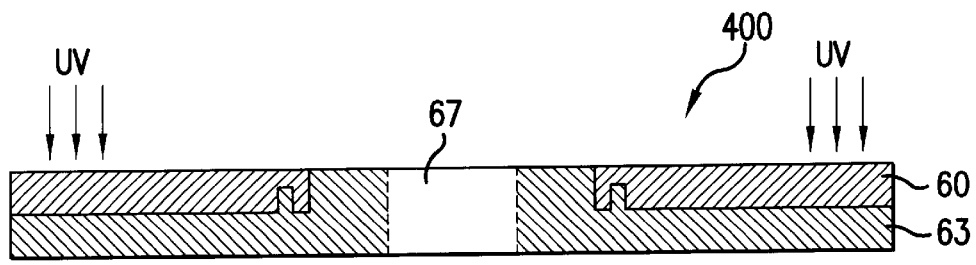
FIG. 6G is a cross-sectional view as in FIG. 6E with UV rays.

When bonding the two disk members 60 and 63 according to the fourth embodiment, inner portions of the disk members 60 and 63 are combined by the cooperation of the projection 68 with the groove 66 as shown in FIGS. 6E–6F. This scheme allows a UV bonding material to be applied only onto the outer edge portion of the second disk member 63 as shown in FIG. 6C, and the rotation of the fitted first and second disk members 60 and 63 uniformly distributes the UV bonding material throughout the surfaces 64 and 71 of the disk members 60 and 63. Ultraviolet rays are also irradiated only onto the outer areas indicated with arrows as shown in FIG. 6G, whereby an optical disk 400 is finally manufactured.

Figure 7A:
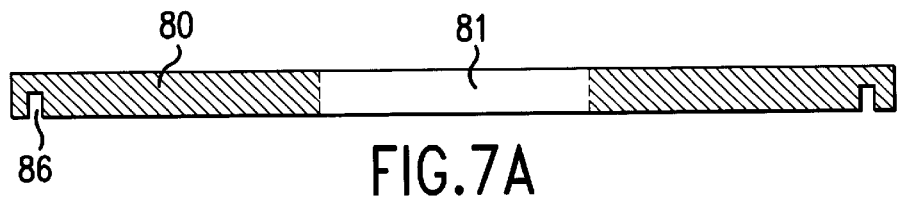
FIGS. 7A and 7B show cross-sectional and top views of a first disk member of an optical disk according to a fifth embodiment of the present invention, respectively.
Figure 7B:
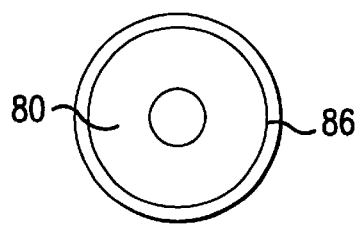
Figure 7C:
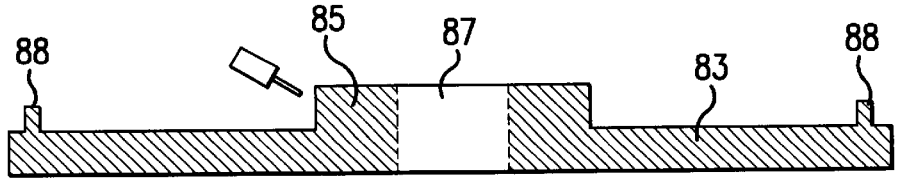
FIGS. 7C and 7D show cross-sectional and top views of a second disk member of the optical disk according to the fifth embodiment of the present invention, respectively.
Figure 7D:
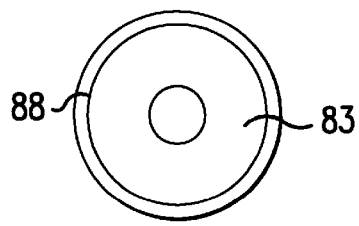
Figure 7E:
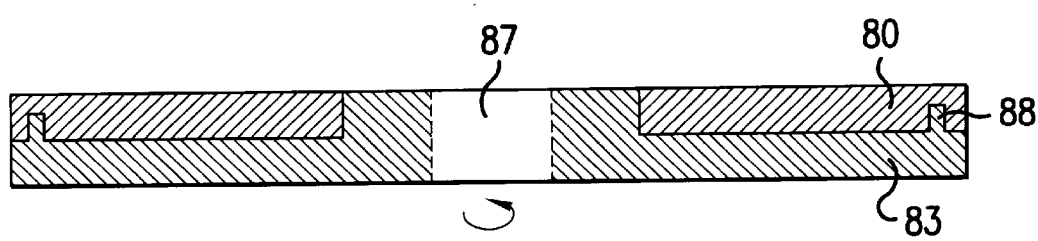
FIGS. 7E and 7F are cross-sectional views of the optical disk composed with the first and second disk members of FIGS. 7A and 7B according to the fifth embodiment of the present invention.
Figure 7F:
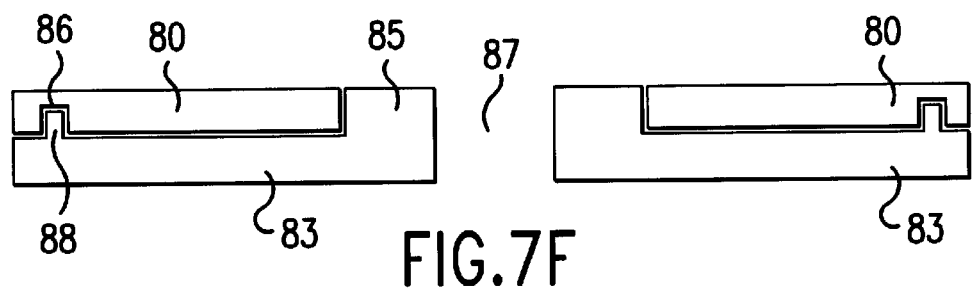
Figure 7G:
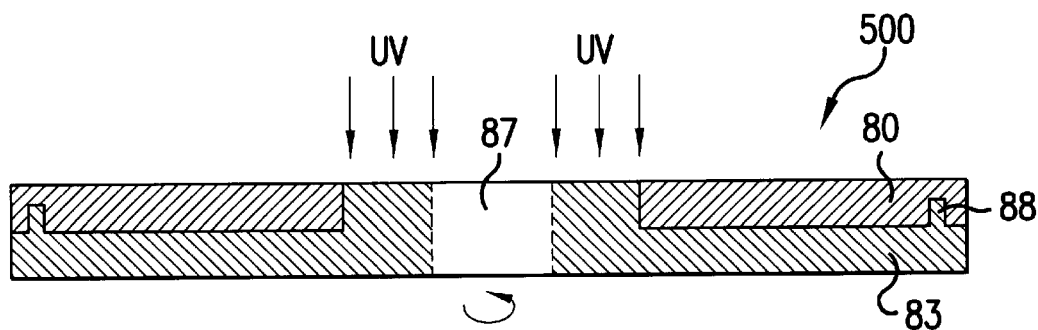
FIG. 7G is a cross-sectional view as in FIG. 7E with UV rays.

FIGS. 7A–7G illustrate steps for manufacturing an optical disk according to the fifth embodiment of the present invention. A first disk member 80 includes a penetrating hole 81, and a second disk member 83 includes a projecting portion 85 with a center hole 87. The dimensions of these elements are the same as the previous embodiments. Unlike the fourth embodiment, however, a groove 86 and a projection 88 are formed on the outer circumferential portions of first and second disk members 80 and 83, respectively. When the first and second disk members 80 and 83 are bonded to each other, the outer circumferential portions of the first and second disk members 80 and 83 are securedly combined by the cooperation of the projection 88 with the groove 86 as shown in FIG. 7E. Consequently, a UV bonding material is applied only onto an inner area of the second disk member 83 as shown in FIG. 7C, and the UV bonding material is uniformly distributed due to the rotation of the fitted first and second disk members 80 and 83. Ultraviolet rays are also applied only on an inner area of the combined first and second disk members 80 and 83 as shown by arrows in FIG. 7G. As a result, an optical disk 500 is manufactured.

Figure 8A:
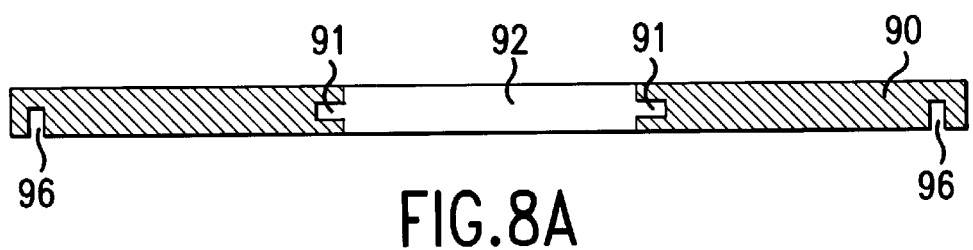
FIG. 8A shows a cross-sectional view of a first disk member of an optical disk according to a sixth embodiment of the present invention.
Figure 8B:
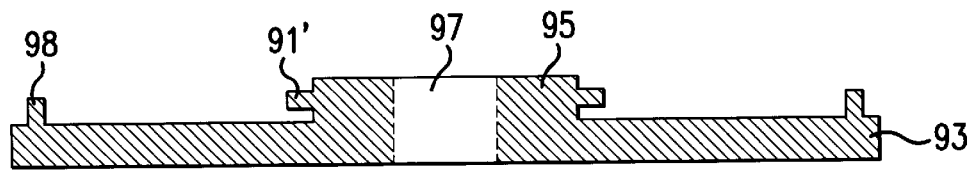
FIG. 8B shows a cross-sectional view of a second disk member of the optical disk according to the sixth embodiment of the present invention.
Figure 8C:
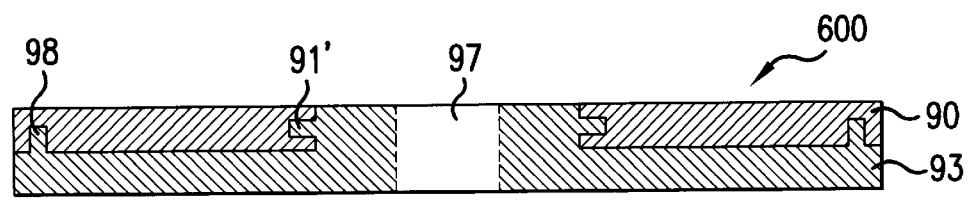
FIG. 8C is a cross-sectional view of the optical disk composed with the first and second disk members of FIGS. 8A and 8B according to the sixth embodiment of the present invention.

FIG. 8A shows a cross-sectional view of a first disk member of an optical disk, FIG. 8B shows a cross-sectional view of a second disk member of the optical disk, and FIG. 8C is a cross-sectional view of the optical disk composed with the first and second disk members of FIGS. 8A and 8B, all according to the sixth embodiment of the present invention.

As shown in FIG. 8A, a first disk member 90 includes a penetrating hole 92 with a first groove 91 formed circumferentially on its inner walls, and a second ring-shaped groove 96 formed on the outer parts of the first disk member 90. A second disk member 93 has projections 91' and 98' formed circumferentially on the outer walls of a projecting portion 95 and the outer parts of the second disk member 93, respectively, as shown in FIG. 8B. The projections 91' and 98' are to be inserted into the grooves 91 and 98, respectively. As in the previous embodiments, a center hole 97 is formed only at the center of the second disk member 93. In this example, the inner and outer parts of the first and second disk members 90 and 93 are securedly fitted to each other by the cooperation of the projections 91' and 98' with the grooves 91 and 98 as shown in FIG. 8C. As a result, an optical disk 600 is manufactured without having to apply a UV bonding material and a UV curing process, thereby greatly simplifying the disk manufacturing process. The general dimensions and shapes of the first and second disk members 90 and 93 are similar to the previous embodiments.

Figure 9A:
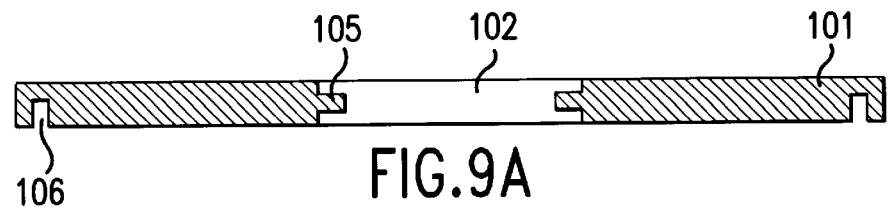
FIG. 9A shows across-sectional view of a first disk member of an optical disk according to a seventh embodiment of the present invention.
Figure 9B:
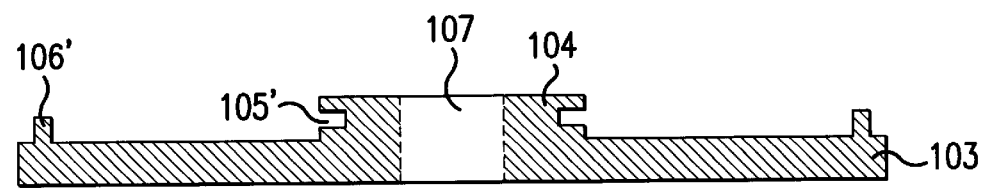
FIG. 9B shows a cross-sectional view of a second disk member of the optical disk according to the seventh embodiment of the present invention.
Figure 9C:
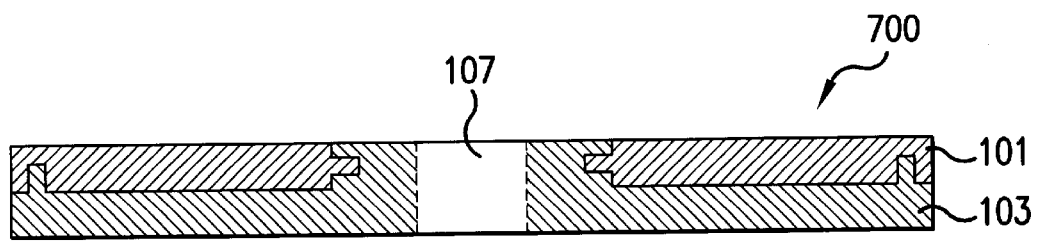
FIG. 9C is a cross-sectional view of the optical disk composed with the first and second disk members of FIGS. 9A and 9B according to the seventh embodiment of the present invention.

FIG. 9A shows a cross-sectional view of a first disk member of an optical disk, FIG. 9B shows a cross-sectional view of a second disk member of the optical disk, and FIG. 9C is a cross-sectional view of the optical disk composed with the first and second disk members of FIGS. 9A and 9B, all according to the seventh embodiment of the present invention;

As shown in FIG. 9A, a first disk member 101 includes a ring-shaped groove 106 on the outer parts of the first disk member 103, which is similar to that of the sixth embodiment. In this example, however, it is not a groove but a projection 105 that is formed on the inner walls of a penetrating hole 102 of the first disk member 101. A second disk member 103 as shown in FIG. 9B includes a projection 106' and a groove 105', which are respectively fitted with the groove 106 and projection 105 of the first disk member 101, whereby an optical disk 700 is manufactured. As in the sixth embodiment, neither a bonding material nor a UV curing process is needed because of the use of projections and grooves at the inner and outer parts of the disk members, which simplifies the disk manufacturing process. As in the previous embodiments, the second disk member 101 includes a projection portion 104 and a center hole 107. The general dimensions and shape of the disk members 101 and 103 can be similar to the previous embodiments.

Figure 10A:
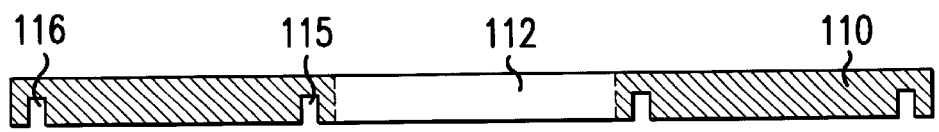
FIG. 10A shows a cross-sectional view of a first disk member of an optical disk according to a eighth embodiment of the present invention.
Figure 10B:
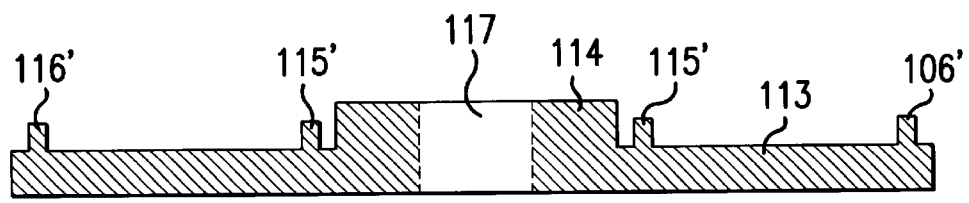
FIG. 10B shows a cross-sectional view of a second disk member of the optical disk according to the eighth embodiment of the present invention.
Figure 10C:
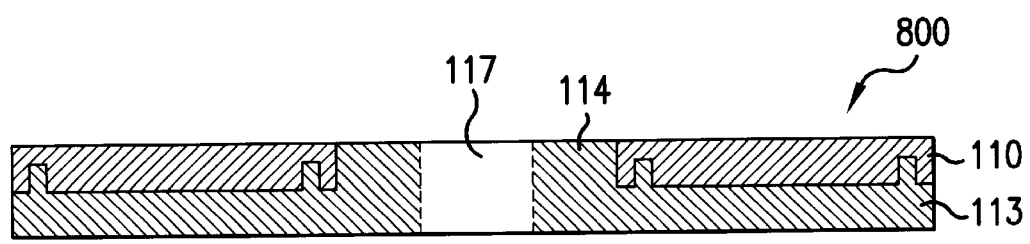
FIG. 10C is a cross-sectional view of the optical disk composed with the first and second disk members of FIGS. 10A and 10B according to the eighth embodiment of the present invention.

FIG. 10A shows a cross-sectional view of a first disk member of an optical disk, FIG. 10B shows a cross-sectional view of a second disk member of the optical disk, and FIG. 10C is a cross-sectional view of the optical disk composed with the first and second disk members of FIGS. 10A and 10B, all according to the eighth embodiment of the present invention.

As shown in FIG. 10A, a first disk member 110 includes a penetrating hole 107 at the center thereof, and first and second ring-shaped grooves 115 and 116 at the inner and outer portions of the first disk member 110. A second disk member 113 as shown in FIG. 10B includes a projection portion 114 with a center hole 117, and first and second projections 115' and 116' at the inner and outer portions of the second disk member 113. The first and second projections 115' and 116' are respectively fitted with the first and second grooves 115 and 116, whereby an optical disk 800 is manufactured. As in the sixth and seventh embodiments, neither a bonding material nor a UV curing process is needed because of the use of projections and grooves at the inner and outer parts of the disk members, which simplifies the disk manufacturing process. The general dimensions and shape of the disk members 110 and 113 can be similar to the previous embodiments.

The method of manufacturing an optical disk according to the first through eighth embodiments of the present invention forms a center hole only on one disk member of the optical disk, thereby effectively reducing manufacturing errors caused by conventional processes of centering two identical disk members.

Furthermore, a small amount of a UV bonding material is applied only onto the areas with no recording and reflective layers and with high optical transmissivity, whereby curing of the UV bonding material with low-powered ultraviolet rays is permitted and the disk bonding/manufacturing process is significantly simplified. The embodiments of the present invention are applicable to DVDs, DVD-RS, DVD-Rams, DVD-Roms, or the like, which can require two-sided recording capability.

Moreover, the present invention makes it easier to load and unload an optical disk, e.g., DVD, on a clamping device of a disk drive which installs the disk by pressing the upper side of the optical disk, and prevents irregular rotation of the disk. That is, a DVD manufactured by conventional methods has a gap in an attachment area created when two disk members are bonded. When loading such a conventional DVD, a ball in the clamping device elastically supported by a spring is inserted to the gap, which obstructs loading and unloading of the DVD. In the present invention, however, the center of one disk member automatically coincides with that of the other disk member when the two disk members are bonded to or combined with each other because only one disk member has a center hole to be positioned within a projecting portion of the other disk member. Hence, bonding of the two disk members can be easily conducted even without using sensors for disk centering. Further, no gap is created in the inner side of the projecting portion of the disk member, which facilitates loading and unloading of the finally manufactured optical disk and prevents irregular rotation of the optical disk. The use of UV bonding material and the curing process may be completely eliminated by using projections and grooves on the disk members.

The invention may be embodied in other specific forms without departing from the sprit or essential characteristics thereof. For example, the dimensions of the disk members can be varied according to need and desire, a different bonding material or the like may be used instead of a UV bonding material, and the projections and grooves may be selectively formed at different locations or circumferential portions of the disk members. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A disk medium comprising:
    a first disk member having a penetrating hole including an inner sidewall;
    a second disk member having a projecting portion, and a center hole formed in the projecting portion, the projecting portion being placed within the penetrating hole of the first disk;
    a groove formed on the inner sidewall and surrounding the penetrating hole;
    a projection formed on a second surface portion of the projecting portion and surrounding the projecting portion, the projection being placed within the groove;
    a second groove formed on an inner surface portion of the first disk member, the second groove being formed on an outer edge portion of the first disk member;
    a second projection formed on an inner surface portion of the second disk member, the second projection being formed on an outer edge portion of the second disk member, the second projection being placed within the second groove,
    whereby the first and second disk members are combined and stacked and a first substantially center position of the first disk member coincides with a second substantially center position of the second disk member.

2. A disk medium according to claim 1, wherein the inner sidewall and second surface portion are inner portions of the first and second disk members.

* * * * *